United States Patent Office 3,828,020
Patented Aug. 6, 1974

3,828,020
ALKOXYALKYLAMINO SALTS OF DISAZO ACID DYES
Arnold Tartter, Lambsheim, Germany, assignor to Badische Anilin- & Soda-Fabrik Aktiengesellschaft, Ludwigshafen (Rhine), Germany
No Drawing. Filed Aug. 21, 1972, Ser. No. 282,341
Claims priority, application Germany, Aug. 27, 1971, P 21 42 939.0
Int. Cl. C09b 31/06
U.S. Cl. 260—191
4 Claims

ABSTRACT OF THE DISCLOSURE

Sulfonic acid group-containing disazo coupling products of aminoazobenzenes and β-naphtholsulfonic acids in the form of their salts with aliphatic amines containing ether linkages. The salts are useful for coloring printing inks and particularly for coloring polypropylene.

The invention relates to dye salts of the formula (I):

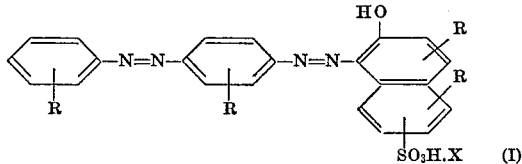

in which each R (independently of another R) is hydrogen or —$SO_3H \cdot X$ and X is the radical of an aliphatic amine of four to twenty carbon atoms which contains an ether grouping.

Dye salts having two or three sulfonic acid groups are preferred.

For the production of the new dye salts, a dye acid of the formula (II):

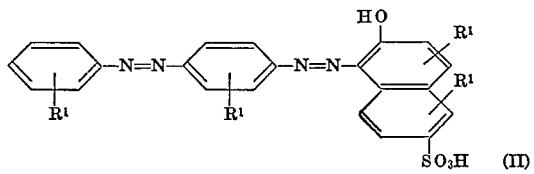

in which each $R^1$ (independently of another $R^1$) is hydrogen or —$SO_3H$ may be reacted with the amine X containing an ether group.

Dye acids of the formula (II) may be for example the coupling products of diazotized p-aminoazobenzenes (which may contain sulfonic acid groups) with 2-naphtholmonosulfonic acids such as 2 - naphthol - 6 - sulfonic acid or 2 - naphthol - 8 - sulfonic acid, 2-naphthol disulfonic acids such as 2 - naphthol - 3,6 - disulfonic acid or 2 - naphthol - 6,8 - disulfonic acid, or 2-naphthol trisulfonic acids such as 2 - naphthol - 3,6,8 - trisulfonic acid.

Examples of aliphatic amines of four to twenty carbon atoms which may be primary, secondary or tertiary and which contain ether groups are: 2 - ethoxyethylamine, 1-methoxy - 3 - aminopropane, 1 - ethoxy-3-aminopropane, 1 - propoxy - 3 - aminopropane, 1-isopropoxy-3-aminopropane, 1 - tert - butoxy - 3-aminopropane, 1-isopentoxy-3 - aminopropane, 1 - hexoxy - 3 - aminopropane, 1-isoheptoxy - 3 - aminopropane, 1-β-ethylhexoxy-3-amino-propane, isononyloxypropylamine, decyloxy - 3 - aminopropane, dodecyloxy - 3- aminopropane, cyclohexyloxy-3-aminopropane, 3 - methoxybutylamine, 3 - ethoxybutylamine, 3 - propoxybuylamine, 2 - methoxyisobutylamine, 2 - amino - 5 - propoxypentane, β - hydroxyethoxyethylamine, methoxyethoxypropylamine, ethoxyethoxypropylamine, di - β - methoxyethylamine, 1 - ethoxy-4 - isopropylaminopentane, tri - β - methoxyethylamine, N - isopropoxy - N,N - dimethylamine, N-isobutoxy-N,N-dimethylamine, N - butoxy-N,N-dimethylamine, N-β-ethylhexoxy - N,N - dimethylamine or N-decyloxypropyl-N,N-dimethylamine.

Amines of eight to fifteen carbon atoms are preferred.

The dye acids of formula (II) may be reacted as free acids with the amines or as alkali metal salts or ammonium salts with water-soluble amine salts for example formates, acetates or hydrochlorides. Mixtures of amines may be used with advantage instead of individual amines.

Reaction in aqueous medium is advantageous and particularly economical. The dye salts may be isolated therefrom for example by suction filtration, pressing off or centrifuging. It is also possible however to use for example an alcoholic solvent or a mixture of water and other solvents.

The new dye salts usually have good to very good solubility in alcoholic solvents, particularly in glycol hemiethers such as ethylene glycol monomethyl ether, ethylene glycol monoethyl ether, or ethylene glycol monobutyl ether. They are suitable for coloring transparent plastics and for the production of transparent varnishes, printing inks, stamping inks or ballpoint pen inks. They have a particular industrial significance however for coloring polypropylene which is to be processed into decorative ribbons and ornamental ribbons. As regards shade of color the azo dyes obtainable from p-aminoazobenzene and 2-naphthol - 6,8 - disulfonic acid or 2 - naphthol-3,6,8-trisulfonic acid and reacted for example with β-ethylhexoxypropylamine in the form of scarlet dye salts are preferred.

The following examples illustrate the invention. References to parts and percentages are by weight unless stated otherwise.

EXAMPLE 1

A neutral solution of 0.3 molar parts of the azo dye from p-aminoazobenzene and 2-naphthol-6,8-disulfonic acid in 6000 parts of water is stirred at room temperature and a solution of 120 parts of 2-ethylhexoxypropylamine and 35 parts of 85% formic acid in 500 parts of water is added in small portions. After stirring for two hours at 45° to 50° C. the water-insoluble dye salt is suction filtered, washed with water, dried at 80° C. at subatmospheric pressure and ground.

About 250 to 260 parts of a dye powder is obtained which has good solubility in ethanol and methanol and excellent solubility in ethyl glycol to give a red color. Polypropylene is colored yellowish scarlet shades by the said dye.

Other dye salts are obtained by using, instead of the abovementioned dye, a solution of 0.3 molar part of the azo dye from p-aminoazobenzene and 2-naphthol-3,6-disulfonic acid or of the azo dye from 4 aminoazobenzene-4'-sulfonic acid and 2-naphthol-6-sulfonic acid in an analogous reaction.

EXAMPLE 2

A diazonium solution of 50 parts of p-aminoazobenzene prepared conventionally is poured at 0° C. into a neutral solution of 100 parts of naphthol-3,6,8-trisulfonic acid in 800 parts of water. Coupling is carried out by adding 10% sodium carbonate solution at a pH of about 9.

After a residence time of one hour the mixture is diluted with water to a volume of 6000 parts, adjusted to pH 5.2 with acetic acid and then a solution of 195 parts of 2-ethylhexoxypropylamine acetate in 500 parts of water is added. The product is isolated and dried. About 270 parts of a red dye salt is obtained which is soluble in alcohols and glycol hemiethers.

It is also possible to isolate the azo dye after coupling and then react it in alochol with the amine acetate at 50° to 60°. The dye salt formed separates on pouring into water.

EXAMPLE 3

14 parts of formic acid (98%) and 56 parts of an amine mixture containing ether groups (obtained by cyanoethylation of a commercial $C_8$ to $C_{10}$ alcohol followed by hydrogenation) are dissolved in 200 parts of water.

This solution is allowed to flow in a thin stream while stirring into a warm (20° C.) neutral solution of 100 parts of Brilliant Crocein MOO (C.I. 27,290) in 4500 parts of water.

The insoluble product formed is separated, washed and dried. A red dye is obtained in a yield of 125 parts. It is easily soluble for example in methanol and ethyl glycol and is suitable for coloring propylpropylene.

By using, instead of the 56 parts of the abovementioned amine mixture:

52 parts of isooctyloxypropylamine,
56 parts of isononyloxypropylamine,
60 parts of decyloxypropylamine,
60 parts of N-β-ethylhexoxypropyl-N,N-dimethylamine,
68 parts of dodecyloxypropylamine, or a mixture of
39 parts of ethylhexoxypropylamine and
11 parts of N-(isobutoxypropyl)-N,N-dimethylamine,
26 parts of ethylhexoxypropylamine and
21 parts of isopentoxypropylamine,
45 parts of decyloxypropylamine and
9 parts of isopropoxypropylamine, or
28 parts of isononyloxypropylamine and
22 parts of hexoxypropylamine, dye salts of similar properties are also obtained.

EXAMPLE 4

10 parts of β-naphthol is dissolved in 50 parts of 23% oleum and after heating for a short time at 115° C. 10 parts of 45% oleum is added. After a long residence time at 100° to 105° C. 2-naphthol-3,6,8-trisulfonic acid is formed in conventional manner.

While the melt is still hot it is added to 100 parts of ice and neutralized with about 100 parts of 50% caustic soda solution. The bulk of the sodium sulfate formed crystallizes out upon standing.

After the solution has been cooled and decanted off from the sodium sulfate, a diazo solution of 14 parts of p-aminoazobenzene is poured in, the whole is gradually adjusted to pH about 9 with sodium carbonate solution and after coupling is over the whole is heated for a short time at 60° to 65° C.

After any potassium chloride has been added suction filtration is carried out in the cold and the filter cake is dissolved in water and filtered.

The filtered solution has added to it a solution of 38 parts of 1-(3',5',5'-trimethylhexoxy)-3-aminopropane in 14 parts of glacial acetic acid and 100 parts of water. The dye salt, which is insoluble in water, is precipitated. After conventional isolation and drying, from 65 to 70 parts of a red dye is obtained which is soluble in alcohols and glycol hemiethers.

If a solution in which 40 parts of the azo dye from 4-aminoazobenzene-4'-sulfonic acid and 2-naphthol-3,6-disulfonic acid or 2-naphthol-6,8-disulfonic acid or from 4-aminoazobenzene-3,4'-disulfonic acid and 2-naphthol-6-sulfonic acid is dissolved, is laked with the above amine salt solution, dye salts having a red shade are also obtained.

I claim:

1. A dye salt of the formula:

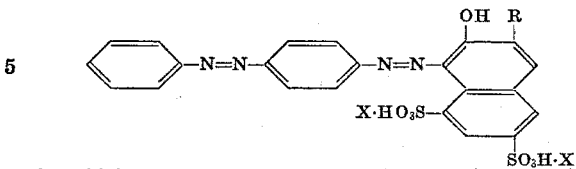

in which

R is hydrogen or $SO_3H \cdot X$ and

X is 1-isopentoxy-3-aminopropane, 1-hexoxy-3-aminopropane, 1-isoheptoxy-3-aminopropane, 1-β-ethylhexoxy-3-aminopropane, iso-nonyloxypropylamine, decyloxy-3-aminopropane, dodecyloxy-3-aminopropane or cyclohexyloxy-3-aminopropane.

2. A dye salt as claimed in Claim 1 wherein R is hydrogen or $SO_3H \cdot X$ and X is 1-isopentoxy-3-aminopropane, 1-hexoxy-3-aminopropane, 1-β-ethylhexoxy-3-aminopropane or cyclohexyloxy-3-aminopropane.

3. A dye salt of the formula claimed in Claim 1 wherein is $SO_3H \cdot X$ and X in each instance is the amine of the formula

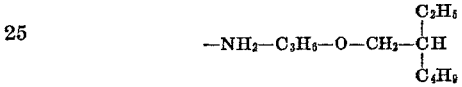

4. The dye salt of the formula

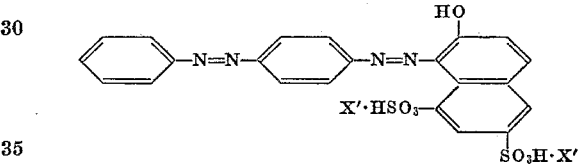

in which X' is the amine of the formula

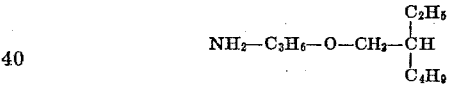

References Cited

UNITED STATES PATENTS

| | | | |
|---|---|---|---|
| 1,800,300 | 4/1931 | Kranzlein et al. | 260—191 |
| 3,640,994 | 2/1972 | Harnisch | 260—191 |
| 2,022,678 | 12/1935 | Kritchevsky | 260—208 X |
| 2,095,077 | 10/1937 | Payne | 260—208 X |
| 2,555,603 | 6/1951 | Ogilvie | 260—208 X |
| 2,773,056 | 12/1956 | Helfaer | 260—208 |

OTHER REFERENCES

Colour Index, 2nd ed. (1957), vol. 3, pp. 3219, 3223, 3224, 3226 and 3227.

C.I. #27000, 27001, 27150, 27160, 27190, 27195, 27290, 27305, 27310.

Colour Index, 2nd ed. (1957), vol. 3, pp. 3226 and 3227.

C.I. #27291, 27306 and 27311.

LORRAINE A. WEINBERGER, Primary Examiner

C. F. WARREN, Assistant Examiner

U.S. Cl. X.R.

260—208, 37 R, 41 C; 106—22, 288 Q; 117—138.8